United States Patent
Chiu et al.

(10) Patent No.: US 8,295,357 B2
(45) Date of Patent: Oct. 23, 2012

(54) METHOD AND APPARATUS FOR ANGULAR-DIRECTED SPATIAL DEINTERLACER

(75) Inventors: Yi-Jen Chiu, San Jose, CA (US); Sang-hee Lee, Santa Clara, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1433 days.

(21) Appl. No.: 11/646,763

(22) Filed: Dec. 27, 2006

(65) Prior Publication Data

US 2008/0158415 A1    Jul. 3, 2008

(51) Int. Cl.
*H04N 7/46* (2006.01)
(52) U.S. Cl. .................. 375/240.21
(58) Field of Classification Search .............. 375/240.21
See application file for complete search history.

(56) References Cited

U.S. PATENT DOCUMENTS

| | | | |
|---|---|---|---|
| 6,630,961 B1 * | 10/2003 | Shin et al. | 348/448 |
| 7,154,556 B1 * | 12/2006 | Wang et al. | 348/452 |
| 2002/0080268 A1 | 6/2002 | Willis | |
| 2004/0096187 A1 | 5/2004 | Lee | |
| 2004/0135926 A1 | 7/2004 | Song et al. | |
| 2005/0134730 A1 * | 6/2005 | Winger et al. | 348/448 |
| 2006/0039631 A1 | 2/2006 | Chao | |

FOREIGN PATENT DOCUMENTS

WO    WO-2005025214    3/2005

OTHER PUBLICATIONS

PCT Search Report, PCT/US2007/088987, mailed May 26, 2008.

* cited by examiner

*Primary Examiner* — Sath V Perungavoor
*Assistant Examiner* — Jeffery Williams
(74) *Attorney, Agent, or Firm* — Blakely, Sokoloff, Taylor & Zafman LLP (57) ABSTRACT

In one embodiment, an apparatus and method for an angular-directed spatial deinterlacer are disclosed. In one embodiment, the method comprises calculating a cost measure for each of multiple angle candidates for a target pixel block to be deinterlaced in a spatial-only domain, determining a horizontal angle measure for the target pixel block, establishing a global minimum angle from the multiple angle candidates by determining the lowest cost measure from the multiple angle candidates, establishing a local minimum angle from the multiple angle candidates by sifting through the angle candidates in a hierarchical manner, and filtering the global minimum angle and the local minimum angle to create a value for interpolating the target pixel block for deinterlacing. Other embodiments are also described.

20 Claims, 6 Drawing Sheets

Target pixel location

X' The left neighboring pixel of previously deinterlaced pixel

METHOD AND APPARATUS FOR ANGULAR-DIRECTED SPATIAL DEINTERLACER

FIELD OF THE INVENTION

The embodiments of the invention relate generally to the field of video signal processing and, more specifically, relate to an angular-directed spatial deinterlacer.

BACKGROUND

Personal computers, along with their monitors, are used in nearly every field of work. Many fields also make use of microprocessors for encoding and decoding video signals. Often times, it is desired to display video content that was originally created for television on a computer monitor. However, television video signals and the video formats of most computer displays are not the same. Computers commonly use a non-interlaced video display format, also called progressive scan. With progressive scan, an entire video frame is scanned line-by-line, typically from top to bottom, to appear on the computer display. The process repeats and rescans the entire frame at a given refresh rate.

In contrast, many sources of consumer video, such as television signals, use an interlaced display format. An interlaced video frame contains two fields. The first field consists of the odd lines in the interlaced video frame and the second field consists of the even lines in the interlaced video frame. When displayed on an interlaced video system, the lines of the two fields are displayed in an alternating fashion. All odd lines of the interlaced video frame are displayed, and then all even lines of the interlaced video frame are displayed.

The use of interlaced display format is still quite common in video products. In a system that aims to display an interlaced video signal on a progressive scan monitor (or other non-interlaced display), a deinterlacing method is applied to adapt the interlaced format. Current generations of video processors deinterlace video by using a variety of techniques.

One field of prior art techniques includes intra-field processing (or spatial-only domain processing) such as bob. Another field of prior art techniques includes inter-field processing (or spatial and temporal domain processing) such as weave, motion adaptive, and motion compensation. The bob and weave techniques are typically applied due to their inherently simple complexity, but at the cost of picture quality. For instance, the bob technique determines an average of the pixels directly above and below (e.g., at 90 degree angles) a pixel being estimated for deinterlacing. This is a simple technique but can lead to reduced picture quality. The motion adaptive and motion compensation techniques achieve a better picture quality, but with a more expensive operation.

Spatial-only deinterlacers are applied in environments that cannot access temporal reference pictures and require minimal complexity. However, conventional spatial deinterlacer techniques, such as bob, fail to provide sufficient picture quality due to the lack of proper angle detection beyond the vertical 90 degree angle typically utilized by the bob technique. A simple and efficient technique to deinterlace interlaced pictures in a quality manner for a spatial-only domain would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for an angular-directed spatial deinterlacer are described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention present an angular-directed spatial deinterlacer to deinterlace interlaced pictures in an efficient and quality manner in a spatial-only domain. The angular-direct spatial deinterlace of embodiments of the invention provides layered techniques to select a best angle for interpolation. For instance, the angle selection is based on the local minimum angle measure in order to utilize the resemblance typically found between neighboring pixels in a frame, as well as on a global minimum angle measure to produce consistent prediction.

In embodiments of the invention, a line-based measure is presented to better predict the best angle that is resilient to pixel perturbation and to handle thin line content. The spatial-only deinterlacer of embodiments of the invention may work as a standalone deinterlacer solution. However, one skilled in the art may appreciate that embodiments of the deinterlacer may be combined with a temporal measure (e.g., frames other than the target frame) to form a motion adaptive or motion compensated deinterlacer solution.

The spatial-only deinterlacer of embodiments of the invention includes: (1) a mechanism to deinterlace the interlaced picture by the process of spatial-only operations of angular detection and angular filtering; (2) a mechanism to provide the spatial angular prediction by utilizing the layered technique to search the most suitable angle with the local minimum measure of the layered angle candidates; (3) a mechanism to provide the spatial angular prediction among multiple angle candidates by utilizing the measures from the local minimum of the layered angle candidates and the global minimum of all angle candidates to achieve better filtering; (4) a mechanism to provide the spatial angular prediction among multiple angle candidates by utilizing the variable size of neighboring lines to measure the angle cost; (5) a mechanism to provide the spatial angular prediction by the technique of edge detection to refine the process of angle prediction; and (6) a mechanism to provide the deinterlace filtering by the angles from the local minimum of layered angle candidates and from the global minimum of all angle candidates.

Figure 1:
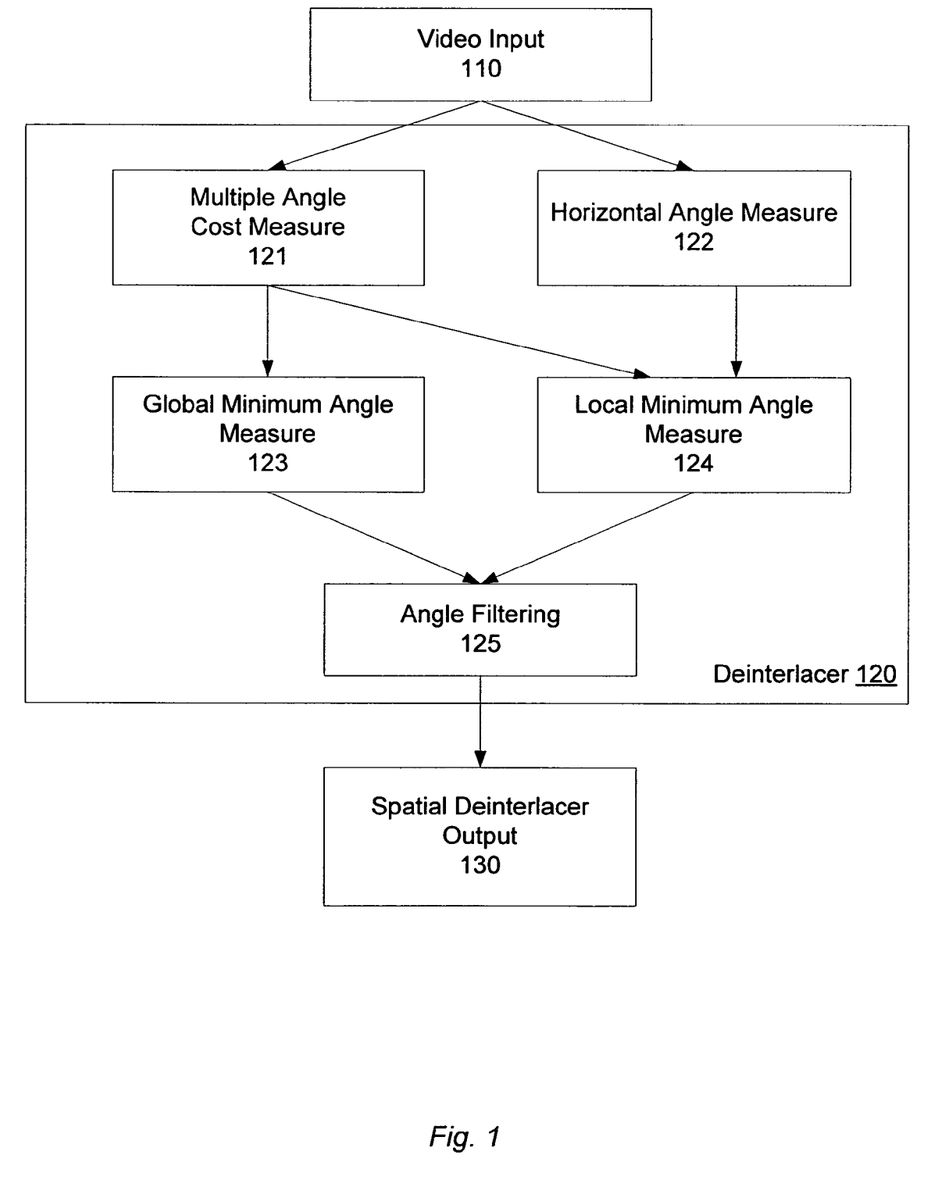
FIG. 1 illustrates a block diagram of one embodiment of an angular-directed spatial deinterlacer.

FIG. 1 is a block diagram depicting one embodiment of components for an angle-directed spatial deinterlacer. A video input 110 is presented to a deinterlacer 120 of graphics processor in a computer system. Within the deinterlacer 120, the video input is sent to a multiple angle cost measure component 121 and a horizontal angle measure component 122. Specifically, a pixel block to be interpolated for the deinterlacing is sent as an input to the deinterlacer. The multiple angle cost measure component 121 applies techniques to measure multiple angle costs for the pixel block, while the horizontal angle measure component 122 performs horizontal angle measures on the pixel block.

Then, the results from the multiple angle cost measure component 121 are sent to both of the global minimum angle measure component 123 and the local minimum angle measure component 124. The results from the horizontal angle measure component 122 are sent solely to the local minimum angle measure component 124. The two best angle candidates for the particular pixel block are determined based on the global minimum of all angle candidates as determined by the global minimum angle measure component 123, and based on a proposed local minimum of the layered angle candidates determined by the local minimum angle measure component 124. The local minimum of the layered angle candidates is, at least in part, determined according to the horizontal angle measure from the horizontal angle measure component 122.

Lastly, angular filtering by the angle filtering component 125 is applied to the two best angle candidates resulting from the global minimum angle measure component 123 and the local minimum angle measure component 124. The angle filtering results in a value to use for pixel interpolation for deinterlacing. The operations of the components 121-125 of deinterlacer 120 are further described in more detail below.

Figure 2:
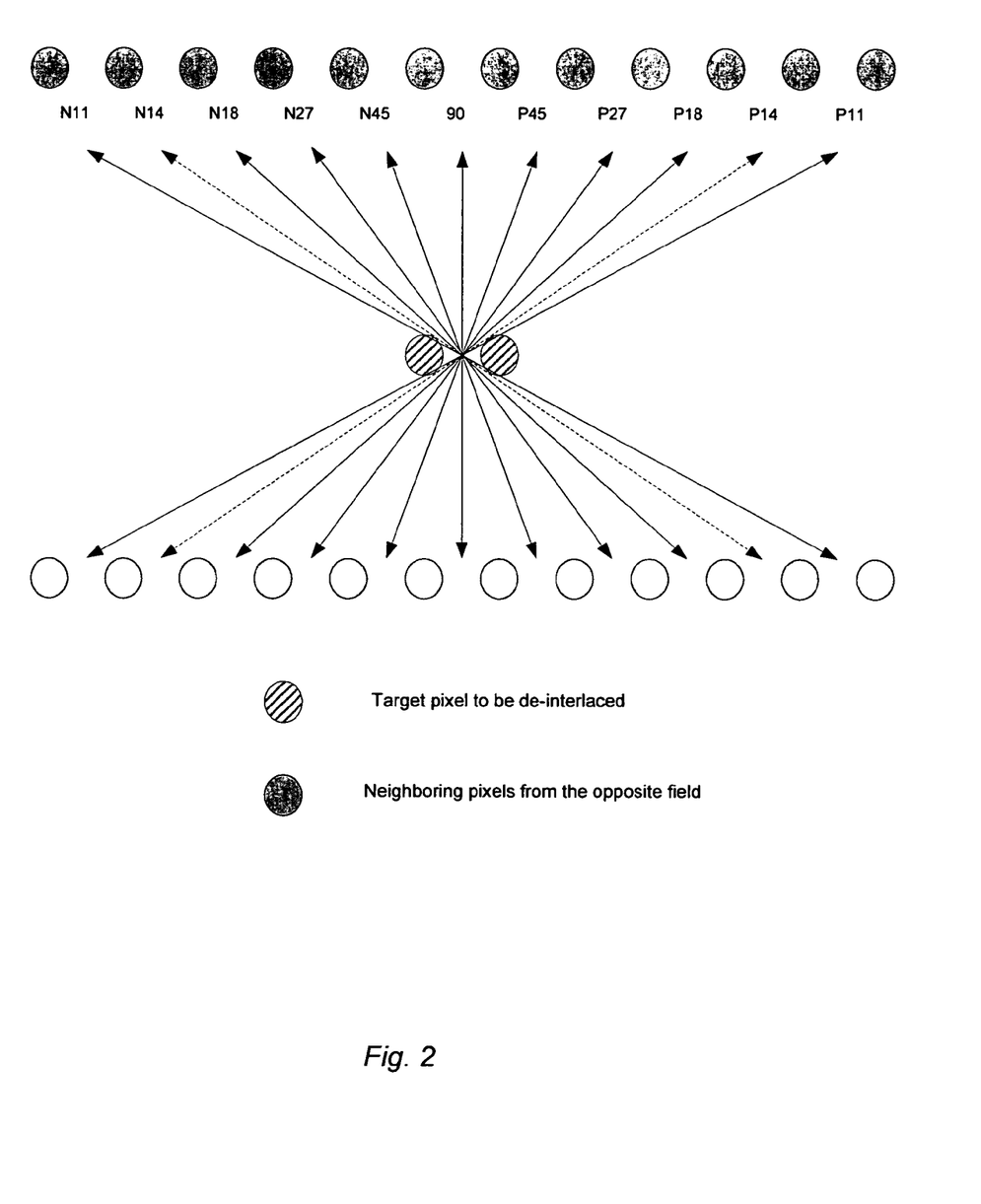
FIG. 2 is a block diagram of one embodiment of a target pixel block and its multiple angle candidates.

Initially, once a target pixel block is presented for interpolation via the deinterlacer, a multiple angle cost measure is performed. FIG. 2 depicts a location of the target pixel block to be de-interlaced and the associated multiple angle candidates (11 angles) pointing to the neighboring pixels of the opposite field. The eleven angles are denoted as 90 degree (90), positive 45 degree (P45), negative 45 degree (N45), positive 27 degree (P27), negative 27 degree (N27), positive 18 degree (P18), negative 18 degree (N18), positive 14 degree (P14), negative 14 degree (N14), positive 11 degree (P11), and negative 11 degree (N11). It should be noted that embodiments of the invention may be expanded beyond the P11 and N11 degrees. Furthermore, embodiments of the invention are not necessarily limited to the specific degree candidates listed above and may include more or less of the same or different angles than those mentioned above.

Embodiments of the invention utilize a line-based measure to determine angle cost measures for the target pixel block. This line-based measure reduces the complexity of deinterlacing. As a result, picture quality is reasonably maintained in deinterlacing. The angle cost measure utilized in embodiments of the invention is based on the sum of absolute difference (SAD) of multiple pairs of neighboring lines per each candidate angle.

Figure 3:
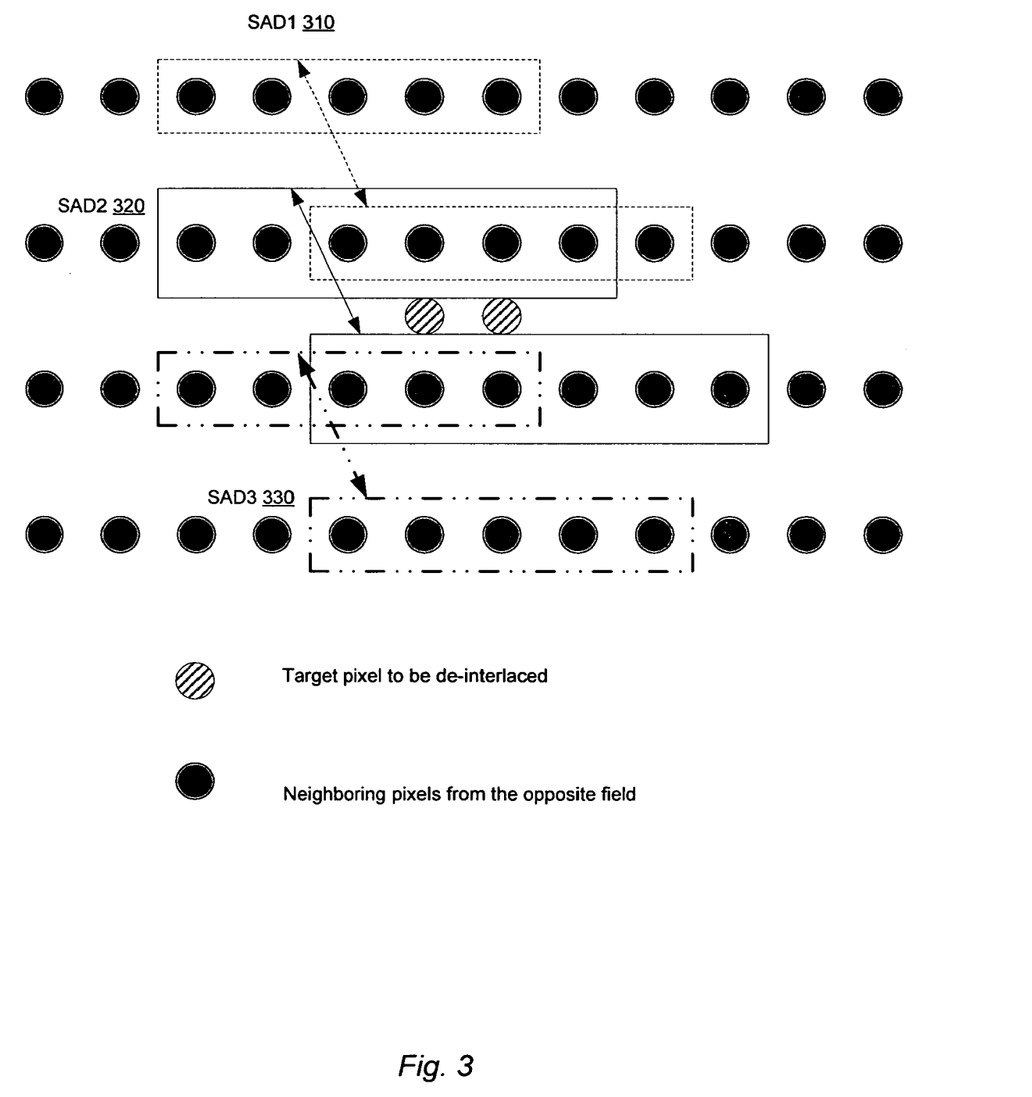
FIG. 3 is a conceptual diagram of one embodiment of determining cost measure for an angle candidate.

FIG. 3 shows an example of angle cost measure for the N45 angle by utilizing three pairs of neighboring lines. The multiple angle cost measure, as shown in FIG. 3, is also repeated on each of the other candidate angles (other than N45) being measured from the target pixel block. In some embodiments of the invention it may be possible to skip one or more angle cost measures, for example the P14 degree and the N14 degree, to further simplify the deinterlacing operation without sacrificing picture quality. In some cases, ignoring these candidate angles may be possible without substantially affecting the results of the deinterlacing.

As illustrated, the SAD between a first line pair 310, a second line pair 320, and a third line pair 330 is individually calculated. These individual SADs are added together for the total SAD for an angle candidate. As illustrated in FIG. 3, SAD1 310 is the pair of lines above the target pixel block at the N45 angle. SAD2 320 is the pair of lines directly above and below the target pixel block at the N45 angle. SAD3 330 is the pair of lines directly below the target pixel block at the N45 angle. It should be noted that more or less line pairs may be utilized in calculating the angle cost measure using the SAD, based on the available resources of the system.

In calculating the SAD between pairs of lines, it is important that the line size of at least one pair is different from the other pair(s). For instance, SAD1 310 and SAD3 330 utilize a 5 pixel line length, while SAD2 320 utilizes a 6 pixel line length. If all line pairs are the same length, then the cost measure would be the SAD between the entire block of pixels (including all of the line pairs). The variability of line pair length and the variability of line pair locations allows for the cost measure to be based on the SAD of each line pair(s), rather than the SAD of an entire pixel block.

In addition to calculating the multiple angle cost measures, embodiments of the invention also determine a horizontal angle measurement for the target pixel block. To determine the horizontal angle measure, the well-known first-order Sobel formula is applied to estimate the edge information:

$$E\_h = \begin{bmatrix} -1 & -2 & -1 \\ 0 & 0 & 0 \\ 1 & 2 & 1 \end{bmatrix},$$

where the horizontal angle measure (AM) is defined as:

$$AM(x) = |n9(x) * E_{\_h}|,$$

where n9(x) is the 3×3 spatial neighborhood pixels of the current target pixel x. The results of the horizontal angle measure are later utilized as part of the local minimum angle measure determination.

Once the multiple angle cost measures and the horizontal angle measure are established, a global minimum angle measure and a local minimum angle measure are determined. The global minimum angle measure, G_min_angle, is the angle candidate of the lowest angle cost measure among all of the angle candidates. For instance, with reference to FIGS. 2 and 3, the global minimum angle measure would be the angle candidate from FIG. 2 with the lowest cost measure as determined by the SAD calculation depicted in FIG. 3.

Figure 4:
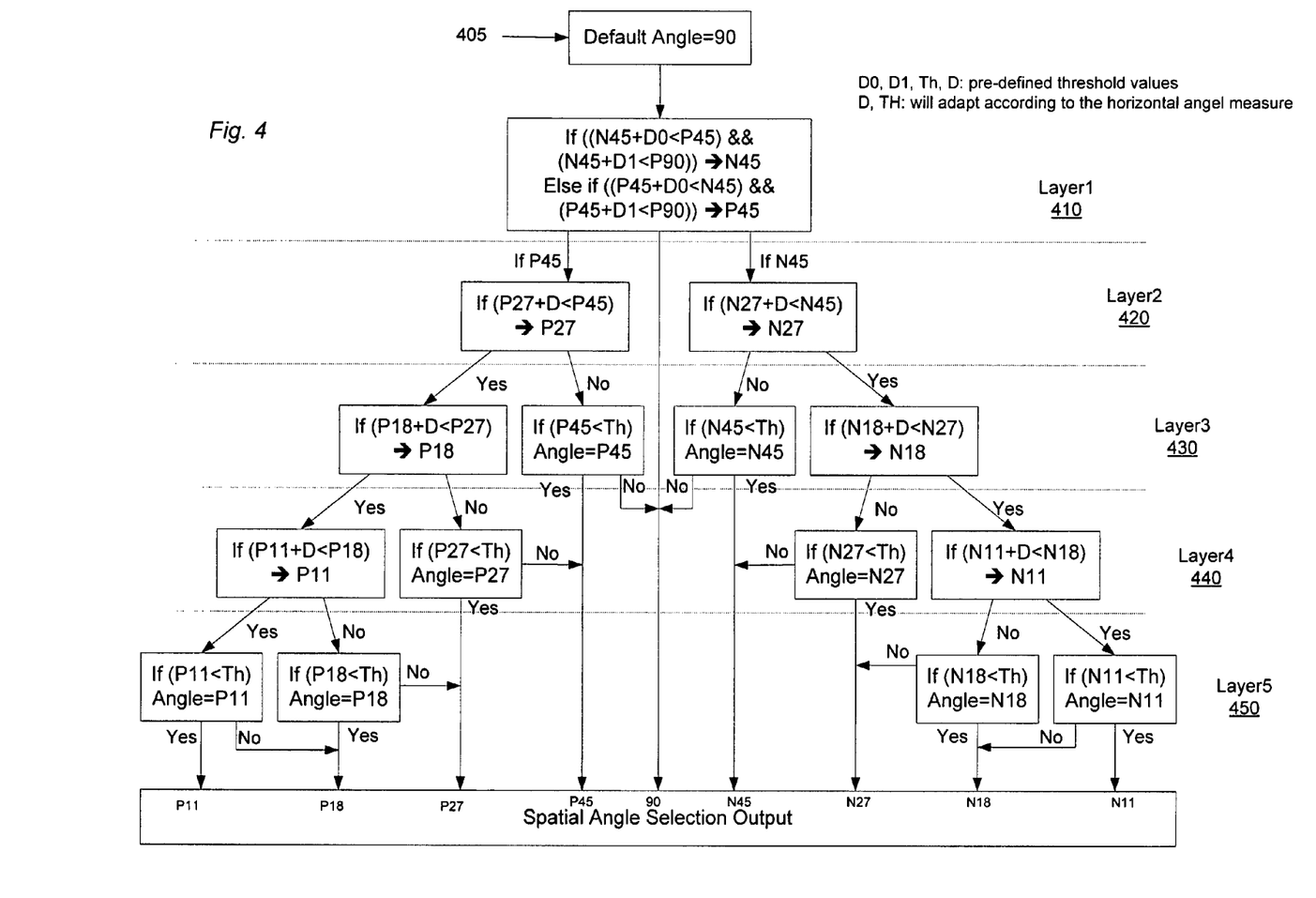
FIG. 4 is a flow diagram of one embodiment of a method for determining a local minimum angle measure.

In addition, the local minimum angle measure is determined. FIG. 4 depicts the hierarchical angle selection based on the local minimum of layered angle candidates. As shown, five layers 410, 420, 430, 440, 450 are illustrated. At block 405, the initial default angle is set to 90 degrees. Then, in layer 1 410, the best angle among 90, P45, and N45 is identified. Then, the cost measures associated with each potential candidate angle are subsequently compared at each of the different hierarchical layers. For instance, if the best angle is selected to be P45 or N45, the process continues to the associated branch of the next layer, layer 2 420, to test against the cost measures for P27 or N27 degrees.

As illustrated, the process is divided at layer 2 420 between the negative and positive angles. If P45 is chosen, then the remaining testing is done among the positive angles. If N45 is chose, the remaining testing is done among the negative angles. The process continues to look for a better candidate angle in the next layers (Layer 3 430, Layer 4 440, and Layer 5 450) until a local best angle is found, L_min_angle.

Also in FIG. 4, threshold values D0, D1, D, and Th are utilized. These values may be modified adaptively according to the value of horizontal angle measure previously determined. When the horizontal angle measure is bigger than a threshold, there is a horizontal angle, and then the default 90 degree is invalid. In such a case, the process in Layer 1 410 is skipped and instead begins at Layer 2 420 to pick up a lower value between P45 and N45. Then, the process continues normally to the search in the next layers until the local best local minimum angle is found.

Figure 5:
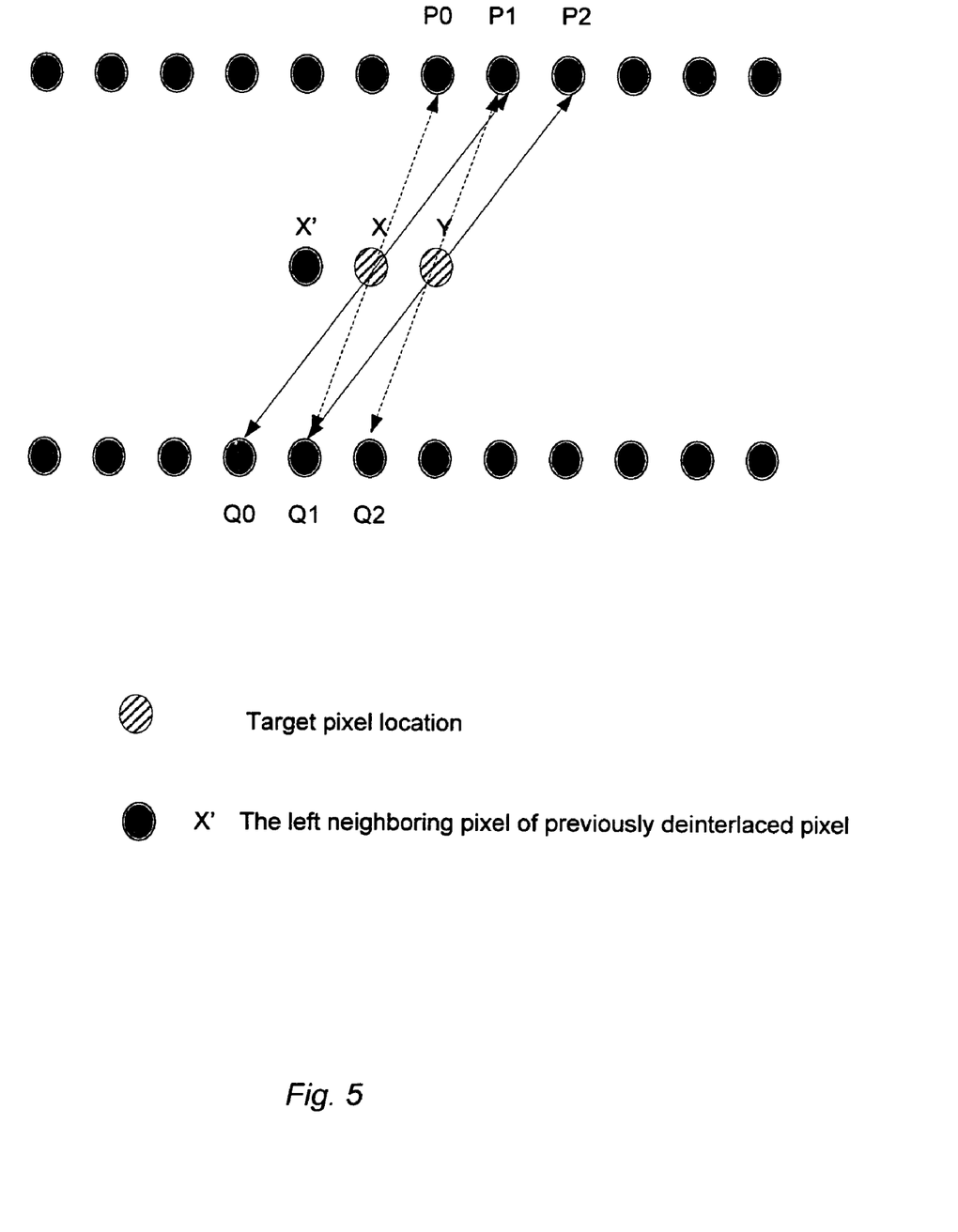
FIG. 5 is a block diagram of one embodiment of angle filtering.

When both of a global minimum angle measure and a local minimum angle measure are established, angle filtering is performed based on these angles, G_min_angle and L_min_angle. FIG. 5 illustrates an example of angle filtering for a hypothetical scenario where G_min_angle=P27 and L_min_angle=P45.

Assuming a target pixel of x, embodiments of the invention present two options of filters. The first option applies an average such as G_filter=(P1+Q0)/2 for the P27 global minimum angle and L_filter=(P0+Q1)/2 for the P45 local minimum angle. Then, the following equation is applied to determine the value used for pixel interpolation: C*G_filter+(1−C)*L_filter, where C is the weighting normalization of the angle costs for G_min_angle and L_min_angle. The second option is to use median5 among {P1, Q0, P0, Q1, X'}, where X' is the left neighbors of target pixel x.

In some embodiments, angle filtering is based solely on the local minimum angle measure and the L_filter may be applied. Utilizing only the local minimum angle measure may achieve sufficient picture quality for most video signals and is also economical in terms of implementation complexity.

Figure 6:
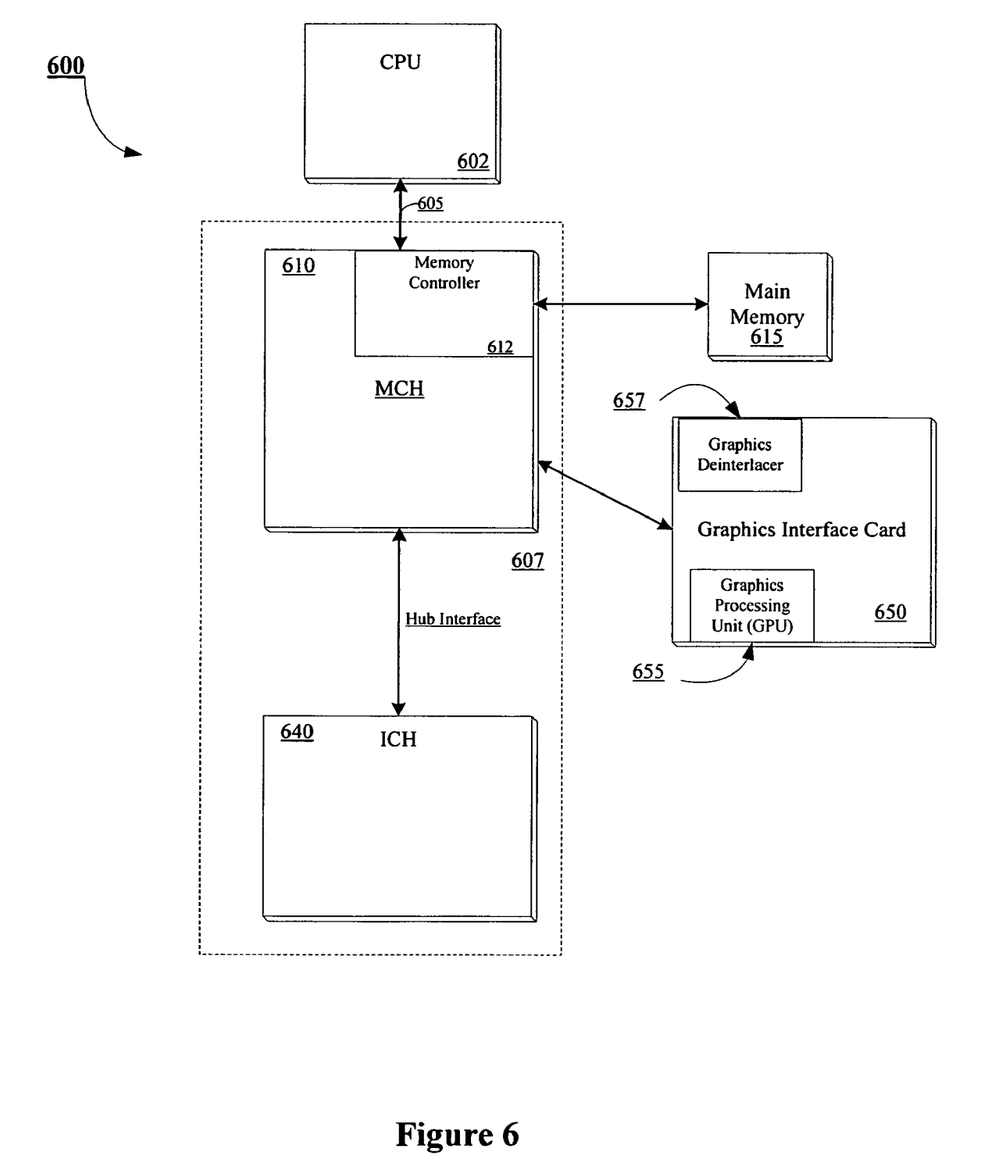
FIG. 6 illustrates a block diagram of one embodiment of a computer system.

FIG. 6 is a block diagram of one embodiment of a computer system 600. In some embodiments, computer system 600 includes the components of FIG. 1 and performs their associated functions. For instance, in some embodiments, graphics interface card 650 with its graphics processing unit (GPU) and graphics deinterlacer 657 may include the components of FIG. 1 and perform the functions described with respect to FIGS. 2 through 5.

Computer system 600 includes a central processing unit (CPU) 602 coupled to interconnect 605. In one embodiment, CPU 602 is a processor in the Pentium® family of processors Pentium® IV processors available from Intel Corporation of Santa Clara, Calif. Alternatively, other CPUs may be used. For instance, CPU 602 may be implemented multiple processors, or multiple processor cores.

In a further embodiment, a chipset 607 is also coupled to interconnect 605. Chipset 607 may include a memory control hub (MCH) 610. MCH 610 may include a memory controller 612 that is coupled to a main system memory 615. Main system memory 615 stores data and sequences of instructions that are executed by CPU 602 or any other device included in system 600.

In one embodiment, main system memory 615 includes one or more DIMMs incorporating dynamic random access memory (DRAM) devices; however, main system memory 615 may be implemented using other memory types. Additional devices may also be coupled to interconnect 605, such as multiple CPUs and/or multiple system memories.

MCH 610 may be coupled to an input/output control hub (ICH) 640 via a hub interface. ICH 640 provides an interface to input/output (I/O) devices within computer system 600. ICH 640 may support standard I/O operations on I/O interconnects such as peripheral component interconnect (PCI), accelerated graphics port (AGP), universal serial interconnect (USB), low pin count (LPC) interconnect, or any other kind of I/O interconnect (not shown). In one embodiment, MCH 610 is coupled to a graphics interface card 650. Graphics interface card 650 includes a GPU 655 and a graphics deinterlacer 657.

It is appreciated that a lesser or more equipped system than the example described above may be desirable for certain implementations. Therefore, the configuration of system 600 may vary from implementation to implementation depending upon numerous factors, such as price constraints, performance requirements, technological improvements, and/or other circumstances.

It should be noted that, while the embodiments described herein may be performed under the control of a programmed processor, such as CPU 602 or GPU 655, in alternative embodiments, the embodiments may be fully or partially implemented by any programmable or hard coded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    a processor calculating a cost measure for each of multiple angle candidates for a target pixel block to be deinterlaced in a spatial-only domain based on a sum of absolute difference (SAD) per each candidate angle between a first line pair above the target pixel block, a second line pair above and below the target pixel block and a third line pair below the target pixel block;
    the processor determining a horizontal angle measure for the target pixel block by applying a first-order Sobel formula;
    the processor establishing a global minimum angle from the multiple angle candidates by determining the lowest cost measure from the multiple angle candidates;
    the processor establishing a local minimum angle from the multiple angle candidates by sifting through the angle candidates in a hierarchical manner; and
    the processor filtering the global minimum angle and the local minimum angle to create a value for interpolating the target pixel block for deinterlacing.

2. The method of claim 1, wherein the cost measure for an angle of the multiple angle candidates is the sum of absolute differences between two or more adjacent line pairs located at the angle from the target pixel pair.

3. The method of claim 2, wherein the one or more adjacent line pairs have variable line length, the line length being the number of pixels to be compared in the line.

4. The method of claim 1, wherein the multiple angle candidates are pixels on adjacent lines from a line of the target pixel block in a same frame, the multiple angle candidates spanning a full spectrum of angles from negative 1 degree to positive 1 degree from the target pixel block.

5. The method of claim 4, wherein the multiple angle candidates include negative 11 degrees, negative 18 degrees, negative 27 degrees, negative 45 degrees, 90 degrees, positive 45 degrees, positive 27 degrees, positive 18 degrees, and positive 11 degrees.

6. The method of claim 1, wherein the horizontal angle measure is determined by applying first-order Sobel formula to the target pixel block.

7. The method of claim 1, wherein the local minimum angle is established by:
    comparing cost measures of each of the multiple angle candidates with the next largest degree of the same positive or negative class starting with 90 degrees; and
    branching subsequently, based on the comparison, to the next smallest degree for another comparison until a condition is met to select the local minimum angle.

8. The method of claim 7, wherein the horizontal angle measure is utilized in the comparing cost measures.

9. The method of claim 1, wherein at least one of an averaging algorithm or a median5 algorithm is applied to the global minimum angle and the local minimum angle for the filtering.

10. An apparatus, comprising:
    a multiple angle cost measure component to calculate a cost measure for each of multiple angle candidates for a target pixel block to be deinterlaced in a spatial-only domain based on a sum of absolute difference (SAD) per each candidate angle between a first line pair above the target pixel block, a second line pair above and below the target pixel block and a third line pair below the target pixel block;
    a horizontal angle measure component to determine a horizontal angle measure for the target pixel block by applying a first-order Sobel formula by applying a first-order Sobel formula;
    a global minimum angle component to establish a global minimum angle from the multiple angle candidates by determining the lowest cost measure from the multiple angle candidates;
    a local minimum angle component to establish a local minimum angle from the multiple angle candidates by sifting through the angle candidates in a hierarchical manner; and
    an angle filtering component to filter the global minimum angle and the local minimum angle to create a value for interpolating the target pixel block for deinterlacing.

11. The apparatus of claim 10, wherein the cost measure for an angle of the multiple angle candidates is the sum of absolute differences between two or more adjacent line pairs located at the angle from the target pixel pair.

12. The apparatus of claim 11, wherein the one or more adjacent line pairs have variable line length, the line length being the number of pixels to be compared in the line.

13. The apparatus of claim 10, wherein the multiple angle candidates are pixels on adjacent lines from a line of the target pixel block in a same frame, the multiple angle candidates spanning a full angle spectrum from negative 1 degree to positive 1 degree from the target pixel block.

14. The apparatus of claim 13, wherein one or more of the multiple angle candidates are skipped without altering results of the deinterlacing.

15. The apparatus of claim 10, wherein the local minimum angle is established by:
    comparing cost measures of each of the multiple angle candidates with the next largest degree of the same positive or negative class starting with 90 degrees; and branching subsequently, based on the comparison, to the next smallest degree for another comparison until a condition is met to select the local minimum angle.

16. An article of manufacture comprising a non-transitory machine-readable medium including data that, when accessed by a machine, cause the machine to perform operations comprising:
   calculating a cost measure for each of multiple angle candidates for a target pixel block to be deinterlaced in a spatial-only domain based on a sum of absolute difference (SAD) per each candidate angle between a first line pair above the target pixel block, a second line pair above and below the target pixel block and a third line pair below the target pixel block;
   determining a horizontal angle measure for the target pixel block by applying a first-order Sobel formula;
   establishing a global minimum angle from the multiple angle candidates by determining the lowest cost measure from the multiple angle candidates;
   establishing a local minimum angle from the multiple angle candidates by sifting through the angle candidates in a hierarchical manner; and
   filtering the global minimum angle and the local minimum angle to create a value for interpolating the target pixel block for deinterlacing.

17. The article of manufacture of claim 16, wherein the cost measure for an angle of the multiple angle candidates is the sum of absolute differences between two or more adjacent line pairs located at the angle from the target pixel pair.

18. The article of manufacture of claim 17, wherein the two or more adjacent line pairs have variable line length, the line length being the number of pixels to be compared in the line.

19. The article of manufacture of claim 16, wherein the multiple angle candidates are pixels on adjacent lines from a line of the target pixel block in a same frame, the multiple angle candidates spanning a full angle spectrum from negative 1 degree to positive 1 degree from the target pixel block.

20. The article of manufacture of claim 16, wherein at least one of an averaging algorithm or a median5 algorithm is applied to the global minimum angle and the local minimum angle for the filtering.

* * * * *